US012565941B2

(12) United States Patent  (10) Patent No.: US 12,565,941 B2
Funato et al.                    (45) Date of Patent: **\*Mar. 3, 2026**

(54) VALVE

(71) Applicant: KITZ CORPORATION, Tokyo (JP)

(72) Inventors: Masazumi Funato, Tokyo (JP);
Mitsuru Hosokawa, Tokyo (JP);
Tetsuya Watanabe, Tokyo (JP); **Osamu
Watanabe, Tokyo (JP); Hisashi
Shimizu**, Yamanashi (JP)

(73) Assignee: KITZ CORPORATION, Tokyo (JP)

( \* ) Notice: Subject to any disclaimer, the term of this
patent is extended or adjusted under 35
U.S.C. 154(b) by 0 days.

This patent is subject to a terminal dis-
claimer.

(21) Appl. No.: 18/643,545

(22) Filed: Apr. 23, 2024

(65) Prior Publication Data

US 2024/0271720 A1      Aug. 15, 2024

Related U.S. Application Data

(63) Continuation of application No. 17/801,748, filed as
application No. PCT/JP2021/007175 on Feb. 25,
2021, now Pat. No. 12,135,098.

(30) Foreign Application Priority Data

Feb. 25, 2020    (JP) ................................. 2020-029678

(51) Int. Cl.
*F16K 41/04*        (2006.01)
*F16K 5/06*         (2006.01)
                    (Continued)
(52) U.S. Cl.
CPC .......... *F16K 41/046* (2013.01); *F16K 5/0636*
(2013.01); *F16K 5/0689* (2013.01);
(Continued)

(58) Field of Classification Search
CPC .... F16K 27/067; F16K 27/107; F16K 41/006;
F16K 41/046; F16K 5/0636;
(Continued)

(56) References Cited

U.S. PATENT DOCUMENTS 3,058,484 A \* 10/1962 Feiring ................... F16K 5/202
137/328
3,077,201 A \* 2/1963 Dumm .................. F16K 5/0673
251/315.08
(Continued)

FOREIGN PATENT DOCUMENTS

CN       101042198 A     9/2007
CN       204477336 U     7/2015
(Continued)

OTHER PUBLICATIONS

Allowance of U.S. Appl. No. 17/801,748, dated Jul. 9, 2024, 12
pages.
(Continued)

*Primary Examiner* — William M Mccalister
(74) *Attorney, Agent, or Firm* — Casimir Jones, S.C.;
Robert A. Goetz

(57)                    ABSTRACT

A valve (10) in accordance with an embodiment of the
present invention includes a body (1) having a space in
which a stem (3) and a ball (4) are housed, wherein an inner
lid body (60) fixing the ball (4) in the space liquid-tightly
partitions the space into a part in which the stem (3) is
housed and a part in which the ball (4) is housed.

12 Claims, 6 Drawing Sheets

(51) Int. Cl.

| | |
|---|---|
| *F16K 5/20* | (2006.01) |
| *F16K 27/06* | (2006.01) |
| *F16K 27/10* | (2006.01) |
| *F16K 31/04* | (2006.01) |
| *F16K 41/00* | (2006.01) |
| *F16K 49/00* | (2006.01) |

(52) U.S. Cl.
CPC ............ *F16K 5/0694* (2013.01); *F16K 5/201* (2013.01); *F16K 27/067* (2013.01); *F16K 27/107* (2013.01); *F16K 41/006* (2013.01); *F16K 31/041* (2013.01); *F16K 49/00* (2013.01)

(58) Field of Classification Search
CPC ...... F16K 5/0689; F16K 5/0694; F16K 5/201; F16K 31/041; F16K 49/00
USPC ........................................ 251/315.01–315.16
See application file for complete search history.

(56) References Cited

U.S. PATENT DOCUMENTS

| | | | | |
|---|---|---|---|---|
| 3,161,204 A | * | 12/1964 | Roy, Sr. ................ | F16K 27/067 251/315.12 |
| 3,179,121 A | * | 4/1965 | Bredtschneider ....... | F16K 5/202 251/315.08 |
| 3,195,857 A | * | 7/1965 | Shafer ................... | F16K 27/067 251/315.15 |
| 3,208,470 A | * | 9/1965 | Lidgard ................ | F16K 27/067 251/315.12 |
| 3,214,135 A | * | 10/1965 | Werner ................. | F16K 5/0689 137/246.22 |
| 3,236,495 A | * | 2/1966 | Buchholz .............. | F16K 5/0689 137/454.6 |
| 3,339,888 A | * | 9/1967 | Dumm ................ | F16K 31/1221 251/367 |
| 3,411,746 A | * | 11/1968 | Scaramucci ............ | F16K 49/00 29/890.128 |
| 3,415,488 A | * | 12/1968 | Priese ................... | F16K 27/067 251/315.08 |
| 3,445,087 A | * | 5/1969 | Davies ................. | F16K 5/0678 251/315.08 |
| 3,458,172 A | * | 7/1969 | Burrows .............. | F16K 5/0621 137/315.19 |
| 3,480,253 A | * | 11/1969 | Davies ................. | F16K 5/0626 251/315.08 |
| 3,714,968 A | * | 2/1973 | Billeter ................... | F16K 24/02 251/315.08 |
| 3,838,844 A | * | 10/1974 | Arn ........................ | F16K 5/202 251/315.12 |
| 4,449,544 A | * | 5/1984 | Soderberg ............. | F22B 37/545 251/117 |
| 4,519,412 A | * | 5/1985 | Grazioli ................. | F16K 5/201 251/315.08 |
| 4,535,970 A | * | 8/1985 | MacAfee .............. | F16K 5/0636 251/315.12 |
| 4,911,408 A | * | 3/1990 | Kemp ................... | F16K 5/0673 251/315.08 |
| 5,129,417 A | * | 7/1992 | Dupont ................. | F16K 27/067 137/454.6 |
| 5,224,829 A | * | 7/1993 | Horvei .................. | F16K 5/0605 251/315.08 |
| 5,927,685 A | * | 7/1999 | Gosling ................ | F16K 5/0694 137/557 |
| 6,378,842 B1 | * | 4/2002 | Frese .................... | F16K 27/067 251/315.12 |
| 7,887,024 B2 | * | 2/2011 | Timko .................. | F16K 5/0694 251/315.08 |
| 9,022,353 B2 | * | 5/2015 | Matsuoka ............. | F16K 5/0668 251/315.12 |
| 12,135,098 B2 | * | 11/2024 | Funato .................. | F16K 27/107 |
| 2003/0193036 A1 | * | 10/2003 | Mike ...................... | F16K 5/201 251/315.01 |
| 2004/0178382 A1 | * | 9/2004 | Yun ...................... | F16K 5/0636 251/315.12 |
| 2014/0084198 A1 | * | 3/2014 | Ikeda ................... | F16K 5/0636 251/192 |
| 2015/0129788 A1 | * | 5/2015 | Hansen, III ............. | F16K 35/06 251/315.01 |
| 2017/0343118 A1 | * | 11/2017 | Balan .................... | F16K 5/0636 |
| 2020/0355276 A1 | * | 11/2020 | Berkovitz .............. | F16K 5/205 |
| 2020/0370662 A1 | * | 11/2020 | Ray ........................ | F16K 5/205 |

FOREIGN PATENT DOCUMENTS

| | | |
|---|---|---|
| CN | 207229895 U | 4/2018 |
| CN | 208845772 U | 5/2019 |
| CN | 209909221 U | 1/2020 |
| DE | 2150628 A1 | 4/1973 |
| DE | 2323942 A1 | 11/1974 |
| DE | 19842199 C1 | 4/2000 |
| JP | 48-29236 Y1 | 9/1973 |
| JP | 59-37382 | 2/1984 |
| JP | 2-12375 Y2 | 4/1990 |
| KR | 1736365 B1 | 5/2017 |

OTHER PUBLICATIONS

Written Opinion for PCT/JP2021/007175, dated May 18, 2021, International Preliminary Report on Patentability, 7 total pages.

International Search Report for PCT/JP2021/007175, dated May 18, 2021, 4 total pages.

Extended European Search Report for EP Patent Application No. 21760986.6, dated Feb. 14, 2024, 8 pages.

Non-Final Rejection, U.S. Appl. No. 17/801,748, mailed Jan. 24, 2024, 10 pages.

Office Action for CN Patent Application No. 202180016516.3, dated Mar. 31, 2025, 7 pages.

* cited by examiner

VALVE

The present application is a continuation of U.S. patent application Ser. No. 17/801,748, filed Apr. 23, 2022, which is a 371 US National Entry Application No. PCT/JP2021/007175, filed Feb. 25, 2021, which claims priority to JP Patent Application No. 2020-029678 filed Feb. 25, 2020. The contents of which are incorporated by reference in their entireties.

TECHNICAL FIELD

The present invention relates to a valve. For example, the present invention relates to a valve which allows a cryogenic fluid such as liquefied hydrogen to flow therethrough.

BACKGROUND ART

In a valve which allows a cryogenic fluid such as liquefied hydrogen (−253° C.) to flow therethrough, a stem connecting an operation section of the valve and a valve element is lengthened so that a cooling effect is brought about by minimizing heat conduction and heat transfer from the fluid and so that a component (packing, etc.) that is vulnerable to low temperatures can be disposed as far away from the fluid as possible. Further, a valve for cryogenic temperature is often disposed inside a jacket (vacuum jacket) that is maintained in vacuum to maintain low temperatures. In such a case, the body is installed so as to be located inside the vacuum jacket, and the operation section is installed so as to be located outside the vacuum jacket. For example, Patent Literature 1 discloses a vacuum jacket type butterfly valve that has a vacuum jacket and a butterfly valve and that has a long stem.

CITATION LIST

Patent Literature

Patent Literature 1

Japanese Patent Application Publication, Tokukaisho, No. 59-37382

SUMMARY OF INVENTION

Technical Problem

A body of a valve for liquefied hydrogen among the low temperature fluids preferably has an integrated structure which is provided by joining a plurality of parts constituting the body to each other by welding, from the viewpoint of preventing leakage. Further, it is desirable that the valve for liquid hydrogen have the above-described vacuum jacket provided in an area from a valve box in which the valve is housed to the operation section for operating opening and closing of the valve. Thus, it is necessary to house, in the body of the integrated structure, the stem connecting the valve element and the operation section. Therefore, the body needs to have a diameter which allows for passage of the valve element.

However, such a configuration requires a member for holding the valve element at a predetermined position. In this regard, Patent Literature 1 describes the feature wherein a valve box fixing shaft (sign 6 in Patent Literature 1) is provided in which a small-diameter cylinder for inserting a valve rod penetrates, and a hollow chamber is formed outside the small-diameter cylinder.

Unfortunately, the configuration described in Patent Literature 1 requires, to hold the valve element at a predetermined position, a valve box fixing shaft having a complex configuration and thus gives rise to a problem of increases in manufacturing cost and maintenance cost. In addition, there is a problem that a temperature on the valve element side is easily transferred to a bundle due to heat conduction of the valve box fixing shaft itself.

Thus, an object of an embodiment of the present invention is to realize a valve that is applicable to cryogenic fluids while preventing increases in manufacturing cost and maintenance cost.

Solution to Problem

In order to solve the above problem, a valve in accordance with an embodiment of the present invention includes: a body constituting a flow path of a fluid, the body having a plurality of first openings for distributing the fluid and a second opening that opens in a direction intersecting with a direction in which the plurality of first openings face and that allows a valve element to pass therethrough; the valve element being placed in the body via the second opening and allowing the flow path of the fluid to be opened and closed; a stem being connected to the valve element and extending outside the second opening; a bonnet sealing the second opening in such a manner that the stem is operable; and an inner lid body partitioning a space in the body into a space on a side of the bonnet and a space on a side of the valve element, in such a manner that the stem is operable and in a liquid-tight or air-tight manner.

Advantageous Effects of Invention

According to an aspect of the present invention, it is possible to provide a valve that is less likely to transfer heat on the side of the valve element to a bundle while preventing increases in manufacturing cost and maintenance cost.

DESCRIPTION OF EMBODIMENTS

Embodiment 1

The following will describe an embodiment of the present invention with reference to FIGS. 1 to 5. Taken as an example of a valve in accordance with an embodiment of the present invention is a top entry type valve that is disposed at a midpoint of a flow path which is formed in a substantially horizontal direction. This, however, does not limit the present embodiment. Alternatively, the valve in accordance with an embodiment of the present invention may be a valve other than the top entry type valve.

The valve in accordance with the present embodiment can cause a fluid flown through a flow path from an upstream side of a valve element to be flown to a downstream side of the valve element or can block the flow of the fluid. A well-known liquid or a well-known gas can be employed as the fluid that is caused to flow through the flow path. Note, however, that the valve in accordance with an embodiment of the present invention can be used as a valve for the aforementioned cryogenic fluid, and can be suitably used as a valve for liquid hydrogen, in particular.

Figure 1:
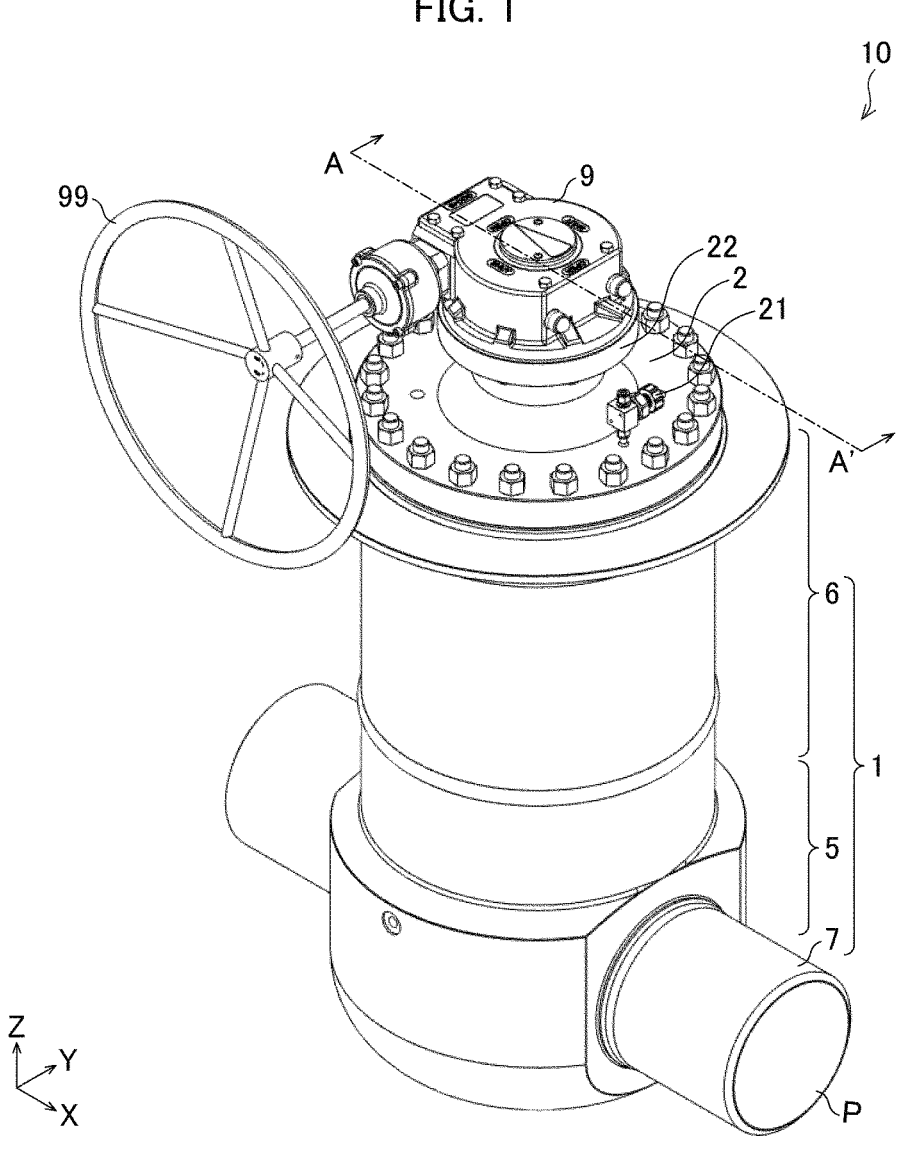
FIG. 1 is a perspective view illustrating an external appearance of a top entry type valve in accordance with an embodiment of the present invention.
Figure 2:
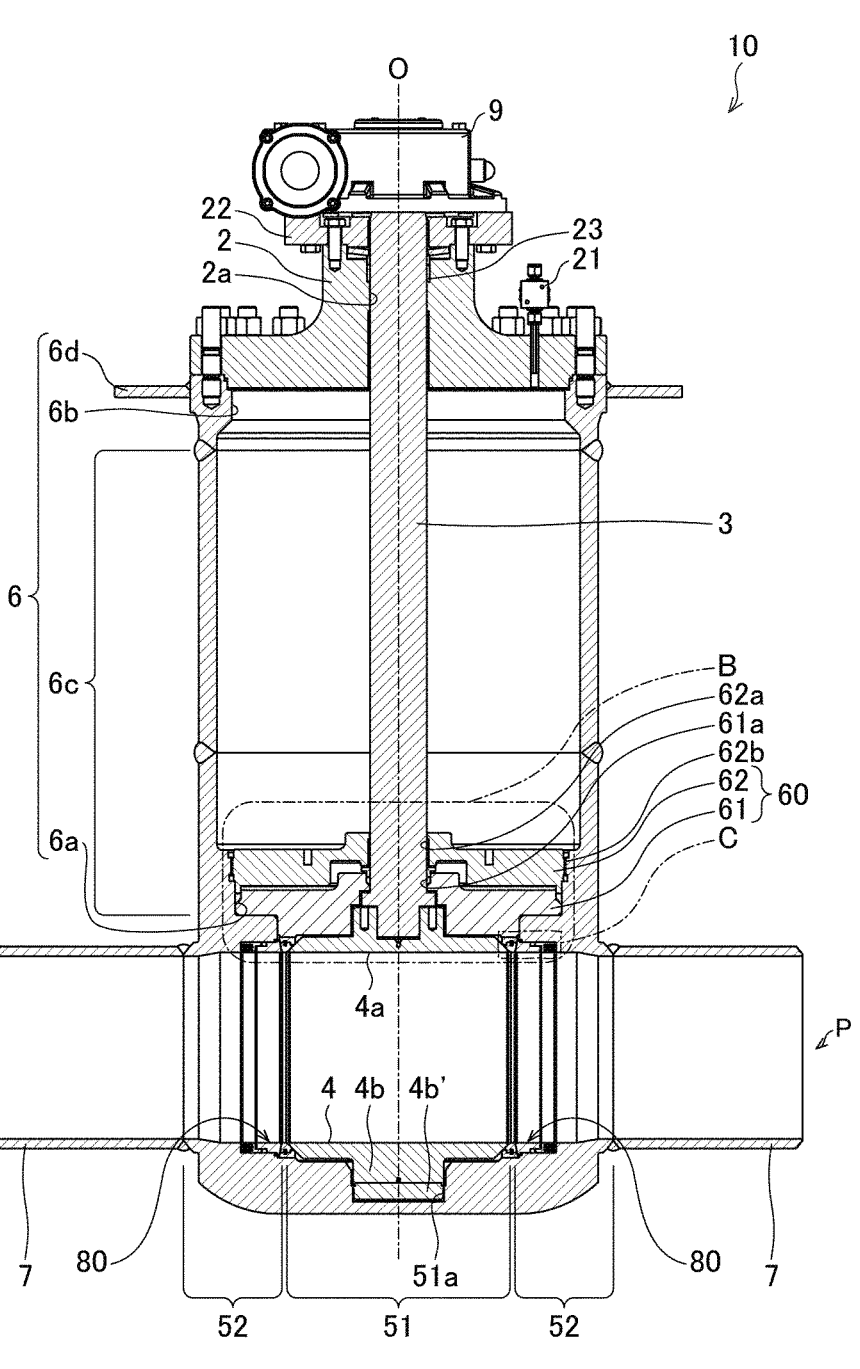
FIG. 2 is a cross-sectional view illustrating a valve taken along a line A-A' illustrated in FIG. 1.
Figure 2:
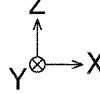

FIG. 1 is an external perspective view of a valve 10 in accordance with an embodiment of the present invention. FIG. 2 is a cross-sectional view illustrating a valve taken along a line A-A' illustrated in FIG. 1. Note that, for convenience of description, three-dimensional coordinates in which a horizontal plane is defined as an XY plane and a zenith direction is defined as a Z direction are also illustrated in FIGS. 1 and 2.

The valve 10 of the present embodiment is configured as a so-called ball valve. Thus, the valve 10 includes a body 1, a ball 4 (valve element) of the ball valve, a stem 3, a bonnet 2, and an operation section 9.

The body 1 has a plurality of first openings (piping structure section 7) for distributing a fluid and an upper end opening 6b (second opening) that opens in a direction (Z-axis direction described later) intersecting with a direction (X-axis direction described later) in which the plurality of first openings (piping structure section 7) face and that allows the ball 4 to pass therethrough, and the body 1 constitutes a flow path of the fluid. Further, the stem 3 constitutes a valve shaft that extends in a vertical direction illustrated in FIG. 2, is connected to the ball 4 (valve element) of the ball valve, and extends outside the upper end opening 6b. Further, the bonnet 2 seals the upper end opening 6b in such a manner that the stem 3 is operable. The bonnet 2 seals the upper end opening 6b (second opening) and is detachably connected to an upper end part of the body 1 with a bolt or the like. The operation section 9 is fixed to the bonnet 2, and an operation performed by the operation section 9 is transmitted to the ball 4 via the stem 3. The operation is performed by a handle 99 (FIG. 1) disposed on the bonnet 2. Specifically, according to the amount of rotation of the handle 99, the ball 4 rotates about a central axis O (FIG. 2) that extends in the vertical direction. In the present embodiment, the flow path is opened and closed by the ball 4, and is changed in state from a closed state to an open state by rotation of the ball 4 through 90°. The state illustrated in FIG. 2 is a state such that the ball 4 is in an open state, and the piping structure section 7 on the left side of the ball 4 on the paper sheet of FIG. 2 and the piping structure section 7 on the right side of the ball 4 on the paper sheet of FIG. 2 are in communication with each other, and is, for example, a state which allows a fluid to flow from the left side of the paper sheet to the right side of the paper sheet.

Note that the operation section 9 (for example, the handle 99) may be provided with an arrow that guides a rotation direction of the handle 99 or a mark that indicates which state a current state of the ball is.

The valve 10 of the present embodiment is configured such that a flow path P extending along the X-axis direction (first direction) is provided in a lower end part of the valve 10, and the ball 4 (FIG. 2) is disposed at a midpoint of the flow path P. The stem 3 is such that an axial direction of the stem 3 is parallel to the vertical direction (Z direction), and the stem 3 is connected to the ball 4 at a lower end thereof and is connected to the bonnet 2 at an upper end thereof.

As illustrated in FIG. 1, the valve 10 has a cylindrical outward form such that the body 1 is long in an up-and-down direction (second direction) and has a diameter which hardly changes from the lower end part of the body 1 to the upper end part thereof. This is as illustrated in FIG. 2. Although the stem 3 is thin and rodlike, a part surrounding the stem 3 in the body 1 has an inner diameter sufficiently larger than the diameter of the stem 3. The reason for this will be described later.

<Body 1>

The body 1 is a body having a welded structure in which the valve element is housed in a lower part of a housing space, and the stem connected to the valve element is housed in an upper part thereof. Specifically, the body 1 includes: a valve element housing section 5 that houses the ball 4 (FIG. 2); a stem housing section 6 that houses the stem 3 (FIG. 2); and the piping structure section 7 that extends in a horizontal direction through side surfaces of the valve element housing section 5.

(Valve Element Housing Section 5)

The valve element housing section 5 has a hollow central region 51 in which the ball 4 can be rotatably disposed.

The central region 51 has an inner surface which abuts on a lower surface of the ball 4, and the central region 51 has provided therein a recess 51a which is provided in the inner surface thereof and in which a protrusion 4b provided on the lower surface of the ball 4 is fitted. Further, above the central region 51, a communication port 6a is opened and is in communication with a hollow part of the central region 51 and an internal space of the stem housing section 6.

The valve element housing section 5 further has an end region 52 that is provided between the central region 51 and the piping structure section 7 and that communicates the hollow part of the central region 51 and an inner part of the piping structure section 7. The end region 52 has a circular tube-shaped inner circumferential surface having a tube shaft that extends along a left-and-right direction of the paper sheet of FIG. 2, and a support mechanism 80 that supports the ball 4 from lateral sides is disposed on the inner circumferential surface of the end region 52. The support mechanism 80 will be described later.

(Ball 4)

Here, the ball 4 will be described. The ball 4 is a sphere and has a flow path 4a which is formed so as to path through the ball 4. The flow path 4a has a diameter that is equal to a pipe diameter (length along the Z-axis direction) of the piping structure section 7 extending in the horizontal direction (X-axis direction) through the side surfaces of the valve element housing section 5. Thus, setting the diameter of the flow path 4a of the ball 4 and the pipe diameter of the piping structure section 7 to be equal to each other prevents the ball 4 from becoming an obstacle to the fluid in the flow path formed from the piping structure section 7. This makes it possible to smoothly flow a large amount of fluid at a high pressure.

The ball 4 has an upper surface connected to the stem 3 and a lower surface that is on an opposite side of the ball 4 from the upper surface, and the protrusion 4b that protrudes downwards is provided on the lower surface of the ball 4. Further, the protrusion 4b is such that a diameter of an end portion (protruding end 4b') which is further from the stem 3 is smaller than a diameter of a portion (base portion) which is closer to the stem 3. Setting the protruding end 4b' to be smaller in diameter in this way allows the protruding end 4b' of the protrusion 4b to function as a guide for fitting to the recess 51a of the valve element housing section 5. This facilitates the installation operation of the ball 4 during valve assembly.

(Stem Housing Section 6)

The stem housing section 6 is a circular tube-shaped structure having an axis of pipe in the vertical direction (Z direction) and has, at a lower end part thereof, a communication port 6a that communicates with the hollow part of the central region 51. An opening diameter (diameter) of the communication port 6a along the horizontal direction is larger than the diameter of the ball 4 along the horizontal direction. Located at the communication port 6a is a part where the upper surface of the ball 4 and the stem 3 are connected to each other. Further, provided at the upper end part of the stem housing section 6 is an upper end opening 6b (opening) that has a diameter larger than the diameter of the ball 4 along the horizontal direction. Further, an inner diameter of an intermediate part 6c which is sandwiched between the lower end part of the stem housing section 6 and the upper end part thereof is also larger than the diameter of the ball 4 along the horizontal direction. Specifically, as illustrated in FIG. 2, the upper end opening 6b and the intermediate part 6c are larger in inner diameter than the communication port 6a. The inner diameter of the intermediate part 6c may be uniform along the vertical direction. However, as illustrated in FIG. 2, the upper end part and the lower end part may have a diameter gradually decreasing toward the end.

Thus, with the configuration in which the inner diameter (including the communication port 6a and the upper end opening 6b) of the stem housing section 6 is larger than the diameter of the ball 4 along the horizontal direction, it is possible to raise the ball 4 together with the stem 3 and take the ball 4 out of the body 1. This makes it possible to perform maintenance of the ball 4. Conversely, it is possible to install the ball 4 in the valve element housing section 5 by lowering the ball 4 from the upper end opening 6b into the body 1. Note that such a type that the valve element is placed in and is taken out through the upper part of the body is referred to herein as a "top entry (type)".

Therefore, with consideration given to the operability of the top entry, the inner diameter of the intermediate part 6c is sufficiently larger than the diameter of the ball 4 along the horizontal direction. Further, as will be described later, an inner lid body 60 that presses the ball 4 from above is provided. With consideration given to a manner of installation of the inner lid body 60, the inner diameter of the intermediate part 6c is large. As an example, the valve 10 of the present embodiment is such that the inner diameter of the intermediate part 6c is close to the length of the valve element housing section 5 along the horizontal direction.

Further, a thickness of a pipe wall of the stem housing section 6 can be as small as, for example, about one-twentieth of the inner diameter of the stem housing section 6. This is because an internal pressure of the stem housing section 6 is not as high as that of the valve element housing section 5 due to the application of no fluid pressure to the stem housing section 6. As an example, the thickness of the pipe wall of the stem housing section 6 can be 4 to 7 centimeters. Further, as illustrated in FIG. 2, the outer diameter of the stem housing section 6 is substantially equal to the length of the valve element housing section 5 along the horizontal direction. Thus, in short, it can be said that the outward form of the valve 10 is cylindrical as described earlier.

Figure 3:
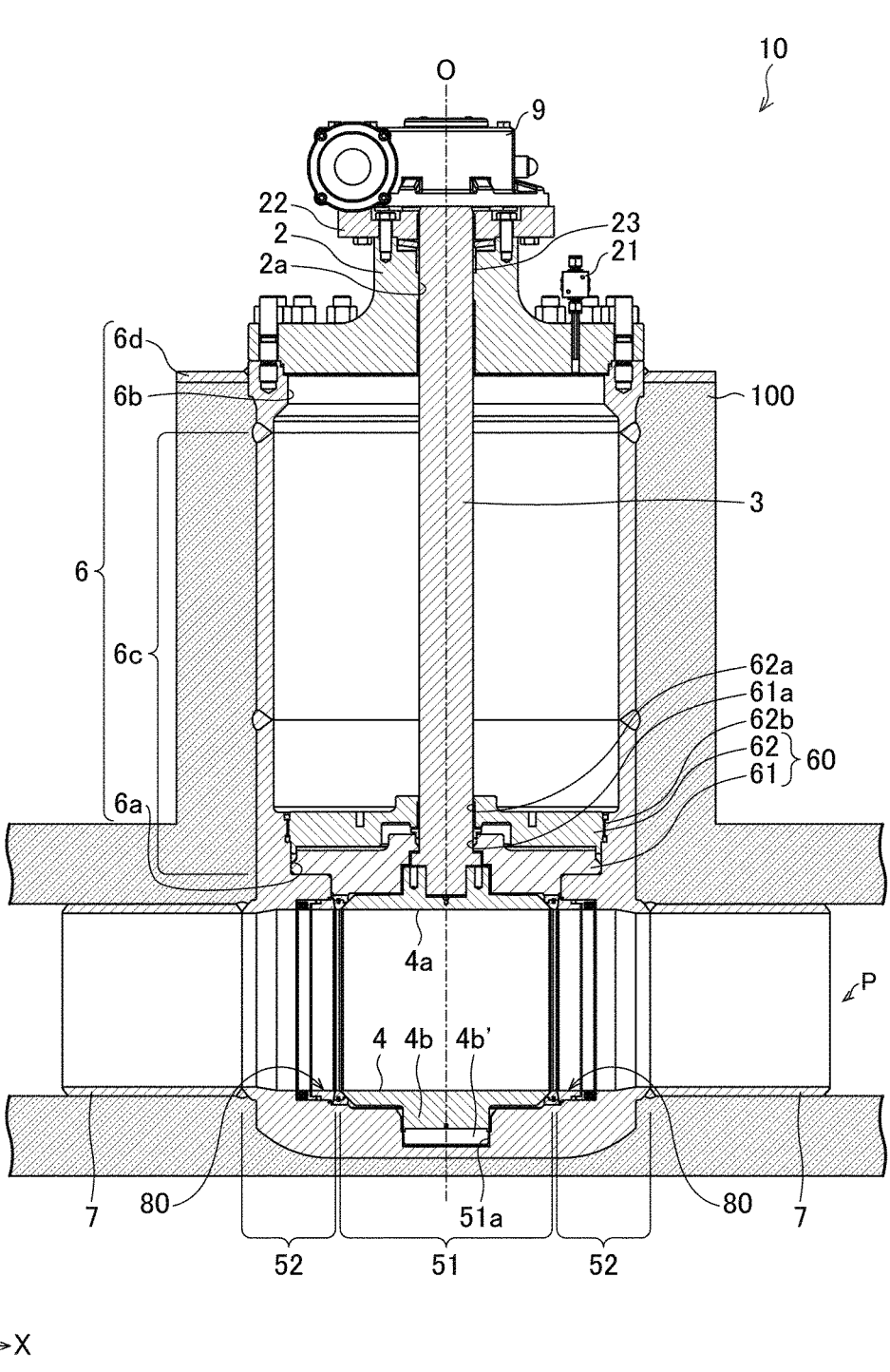
FIG. 3 is a cross-sectional view illustrating another form of the valve illustrated in FIG. 1, with a vacuum jacket attached to the valve illustrated in FIG. 1.

Here, the valve 10 of the present embodiment can be configured such that a vacuum jacket 100 for providing airtight sealing is provided around the outside of the body 1, as illustrated in, for example, FIG. 3. A heat insulation effect yielded by the provision of the vacuum jacket 100 allows liquid hydrogen flowing through the flow path to be maintained at an appropriate temperature. The vacuum jacket 100 is attached to a flange part 6d that laterally protrudes at the upper end part of the stem housing section 6 illustrated in FIG. 2, in a manner such that the bonnet 2 is exposed outside the vacuum jacket 100. Since the valve 10 is a top entry type valve as described earlier, the vacuum jacket 100 can completely cover all parts except for the bonnet 2. Note that the valve 10 of the present embodiment may include or may not include the vacuum jacket 100 as a constituent element.

(Stem 3)

Next, the stem 3 housed in the stem housing section 6 will be described. The stem 3 serves to connect the operation section 9 and the ball 4 as described earlier, and is a so-called long stem that is long with the aim of greatly separating a component which is vulnerable to low temperatures and the ball 4 through which the fluid passes. One reason for such a configuration is that the valve 10 of the present embodiment is a top entry type valve for liquid hydrogen. When liquid hydrogen flows through the flow path P, the temperature of the valve element housing section 5 including the ball 4 becomes equal to the temperature of the liquid hydrogen (−253° C.). Meanwhile, a gland packing 23 for preventing fluid leakage from around the shaft of the stem 3 is installed in a part of the bonnet 2. When the temperature of the gland packing 23 becomes an excessively low temperature, the stem may not operate normally. Further, when the temperature of the operation section 9 becomes an excessively low temperature, an operation failure of the operation section 9 may occur. Thus, in the present embodiment, a measure is taken to prevent a decrease in temperature of the bonnet 2 and the operation section 9 by separating the bonnet 2 and the operation section 9 from the ball 4. With the stem 3 connecting the operation section 9 and the ball 4, the operation of the operation section 9 is transmitted to the ball 4 at a distance from the operation section 9, even in a state in which the operation section 9 and the ball 4 are separated.

The length of the stem housing section 6 in the vertical direction (Z direction) can be determined by the length of the stem 3, and the length of the stem 3 can be determined according to the operability of the valve. For example, for a valve for an ultra-low temperature fluid such as liquid hydrogen, the length of the stem 3 can be determined as appropriate, on the basis of a calculated value or an experimental value, in such a range that thermal energy caused by the fluid does not substantially limit the operation of the operation section of the valve. Further, the length of the stem 3 can be determined depending on, for example, the material and structure of the stem 3, in such a range that the stem 3 has properties, such as mechanical strength, required for the operation of the valve element. For example, if the material of the stem 3 has a low degree of heat transfer property, or if the stem 3 has a porous structure, or if the stem 3 has a component, such as a fin, for enhancing heat dissipation property, the length of the stem 3 is expected to be shorter. A suitable length of the stem 3 varies depending on these various conditions. For example, in a case where a fluid is liquefied hydrogen, it is preferable that the length of the body at a temperature at which the operation section or a packing (gland packing 23) does not freeze (preferably −20° C. to 0° C., more preferably −10° C. to 0° C., particularly preferably approximately 0° C.) is set, and the length of the stem is then set according to the length of the body.

Note that, although the valve 10 of the present embodiment includes the stem 3 which is long and the stem housing section 6 which realizes the top entry type, the inner lid body 60 is attached to the communication port 6a of the stem housing section 6 in the present embodiment in order to reliably place the ball 4 in the valve element housing section 5. The following will describe the inner lid body 60.

(Inner Lid Body 60)

The inner lid body 60 is attached to an inner surface of the body 1 which forms a housing space of the body 1, and liquid-tightly or air-tightly partitions off a space on the ball 4 side (valve element housing section 5) in the body 1 in such a manner that the stem 3 is operable. Specifically, the inner lid body 60, which is housed in the stem housing section 6, partitions the housing space of the body 1 by sealing the communication port 6a from the stem housing section 6 side, in a state in which the stem 3 passes through the inner lid body 60, and causes the ball 4 to be rotatably placed in the valve element housing section 5. The inner lid body 60 has a trunnion plate 61 (first plate) and a yoke plate 62 (second plate) in this order from the side closer to the valve element housing section 5. In the valve 10 of the present embodiment, in this way, the valve element housing section 5 and the stem housing section 6 are separated only by the inner lid body 60 in the body 1, and particularly, only the inner lid body 60 is disposed between the ball 4, which is a valve element, and the stem housing section 6. That is, in the present embodiment, the valve element housing section 5 and the inner lid body 60 constitute a so-called valve box, and if the inner lid body 60 was absent, the ball 4 would be exposed to the stem housing section 6. Further, the inner lid body 60 is constituted by a plate structure which is the trunnion plate 61 and the yoke plate 62, and is compactly attached to the inside of the body 1. Accordingly, the valve 10 as a whole can have a compact outer shape.

The trunnion plate 61 and the yoke plate 62 are both circular plate bodies. Provided in the center of the trunnion plate 61 is a through hole 61a through which the stem 3 passes, and provided in the center of the yoke plate 62 is a through hole 62a through which the stem 3 passes.

Further, provided on an outer circumferential surface 62b of the yoke plate 62 is a screw structure that is screwed with another screw structure which is provided on a portion of the inner circumferential surface of the stem housing section 6, and the yoke plate 62 can be fixed to a desired position of the stem housing section 6 by the screwing. Note that a portion to which the inner lid body 60 is fitted is a lower end portion of the intermediate part 6c in the inner circumferential surface of the stem housing section 6, and corresponds to a portion having a decreased inner diameter. That is, the thickness of the pipe wall of this portion is larger than that of the pipe wall of the other portions of the stem housing section 6. This makes it possible to withstand a radial load associated with the fitting of the inner lid body 60. Note that the fixing of the yoke plate 62 is not limited to the fixing with such a screw, and may be fixing with a predetermined fixing means which can be attached to and detached from the body 1, including, for example, fixing to the body 1 with a bolt.

In consideration of, for example, ease of assembly, screwing with a screw structure with respect to the body is preferable.

Meanwhile, the trunnion plate 61 is fitted to the inner circumferential surface of the stem housing section 6. However, unlike the yoke plate 62, the trunnion plate 61 is not fixed to the body 1 with use of some fixing means by, for example, screwing. The trunnion plate 61 is fixed at a position illustrated in FIG. 2 by being pressed by the yoke plate 62 toward the ball 4. This will be further described with reference to FIG. 4.

Figure 4:
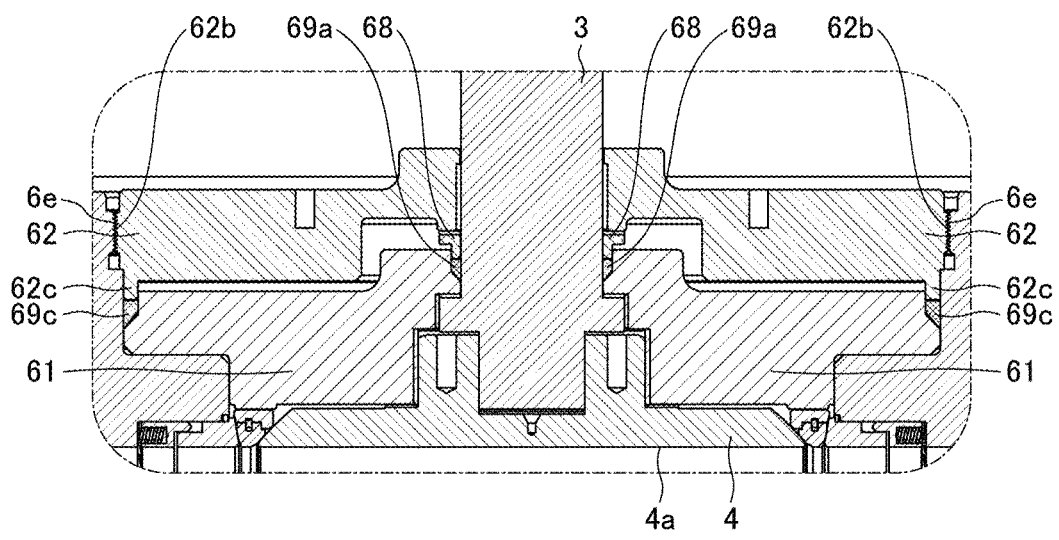
FIG. 4 is an enlarged cross-sectional view of an area B enclosed by a dotted and dashed line illustrated in FIG. 2.

FIG. 4 is an enlarged cross-sectional view of an area B enclosed by a dotted and dashed line illustrated in FIG. 2. FIG. 4 illustrates the area including the ball 4, the trunnion plate 61, and the yoke plate 62 in an enlarged view. The trunnion plate 61 is disposed above the ball 4, and the yoke plate 62 is disposed above the trunnion plate 61. The trunnion plate 61 has a decreased diameter portion, which fits to the communication port 6a, and an increased diameter portion, which is closer to the intermediate part 6c than to the communication port 6a and is larger in diameter than the decreased diameter portion. Further, the trunnion plate 61 is supported so as not to move further toward the ball 4, in such a manner that a lower surface of a step between the increased diameter portion and the decreased diameter portion abuts on an upper surface of a decreased diameter portion of the communication port 6a which protrudes toward an inner diameter side of the body 1. Furthermore, since the trunnion plate 61 is supported by the decreased diameter portion of the communication port 6a in this way, a clearance between a surface of the trunnion plate 61 on a ball 4 side and the ball 4 and the stem 3 is maintained. This prevents the surface of the trunnion plate 61 on the ball 4 side from abutting on the ball 4 and the stem 3. This reduces an opening and closing torque since the trunnion plate 61 does not slide over the ball 4 and the stem 3 when the ball 4 is opened and closed, and also prevents, for example, the ball 4 from being worn out due to the sliding.

Further, the trunnion plate 61 and the yoke plate 62 are in contact with each other via seal members 69a and 69c, not in such a manner that their counter surfaces abut on each other. Specifically, the seal members 69a and 69c are provided in a gap between the inner circumference of the through hole 61a of the trunnion plate 61 and the stem 3 and in a gap between the outer circumferential surface of the trunnion plate 61 and the inner circumferential surface of the body 1 (stem housing section 6), respectively, to seal these gaps. The yoke plate 62 has, at an outer circumferential part thereof, a protruding portion 62c that protrudes toward the trunnion plate 61 and pushes the seal member 69c from above. Further, a gland member 68 is disposed below an end portion of the through hole 62a of the yoke plate 62 and pushes the seal member 69a downward. The seal members 69a and 69c and the trunnion plate 61 abut on each other at tapered surfaces. In such a state, when they are pushed downward from above by the yoke plate 62, a force similar to a force exerted by a wedge is generated, and the inner and outer circumferences of the trunnion plate 61 are securely sealed by the seal members 69a and 69c. As a result, high sealing properties are exhibited.

As described above, downward movement (movement toward the ball 4) of the trunnion plate 61 is structurally restricted. However, the trunnion plate 61 can be moved in the other directions (upward direction and rotation direction). For example, the fluid flowing through the flow path 4a comes around the position of the trunnion plate 61 and is sealed by the seal members 69a and 69c. However, in a case where the fluid pressure exceeds a holding force exerted by the seal members 69a and 69c, the trunnion plate 61 is pushed upward. In the present embodiment, as described above, the trunnion plate 61, which is virtually not fixed to the body 1 and is in a free state, is subjected to restriction in upward movement by the yoke plate 62 being fixed to the body 1. In the present embodiment, a seal (shaft seal) provided by the seal member 69a around the stem 3 and a seal (outer circumferential seal) provided by the seal member 69c on the outer circumferential part of the trunnion plate 61, each have a so-called pressure seal structure by which a sealing force is increased when a force is applied to each of the seal members 69a and 69c as the trunnion plate 61 is pushed up by the fluid pressure. Thus, even though the yoke plate 62 is fixed only in the vicinity of the outer circumference thereof, both the outer circumferential seal and the shaft seal can exhibit sufficient sealing properties.

Further, an outer ring 67 is sandwiched between a lower surface (end portion on the side closer to the ball 4) of the trunnion plate 61 and the ball seat 81 of the support mechanism 80 which will be described later.

Thus, since the inner lid body 60 is attached to the stem housing section 6, it is possible to reliably house the ball 4 in the valve element housing section 5. Also, since the communication port 6a is sealed by the inner lid body 60, it is possible to avoid a situation where the ball 4 jumps upwards inconveniently. This makes it possible to prevent leakage of liquid hydrogen to the stem housing section 6.

Further, the screw structure of the yoke plate 62 is screwed with the screw structure of the stem housing section 6, thereby pressing and fixing the trunnion plate 61 around the communication port 6a. That is, the trunnion plate 61 is not in a mode of being screwed toward the ball 4 with the screwing of the yoke plate 62, and a screwing force is prevented from being transmitted to the ball 4 via the trunnion plate 61. Particularly, since the counter surfaces of the trunnion plate 61 and the yoke plate 62 are not in direct contact with each other, it is possible to prevent the screwing force of the yoke plate 62 from being transmitted to the ball 4 via the trunnion plate 61.

Further, as described with reference to FIG. 3, in the valve 10 of the present embodiment, the inner lid body 60 of the plate structure is disposed in the hollow part of the stem housing section 6 (body 1), and any structure other than the stem 3 is not disposed between the inner lid body 60 and the bonnet 2. This makes it possible to limit heat conduction between the ball 4 and the bonnet 2 to heat conduction by the body 1 and the stem 3, as compared to a case where other structure is disposed in the hollow part. Thus, the heat of the bonnet 2 or the operation section 9 is not excessively transferred to the flow path P through which liquid hydrogen flows. Conversely, the above-described problem caused by excessive transfer of the cryogenic temperature of the fluid P from the flow path P to the bonnet 2 and the operation section 9 does not occur.

(Support Mechanism 80)

Figure 5:
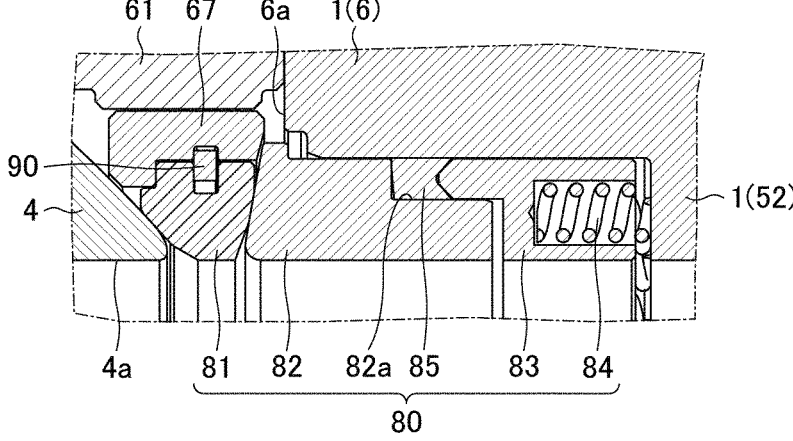
FIG. 5 is an enlarged cross-sectional view of an area C enclosed by a dotted and dashed line illustrated in FIG. 2.

The support mechanism 80 supports the ball 4 from lateral sides. The support mechanism 80 will be described below with reference to FIG. 5. FIG. 5 is an enlarged cross-sectional view of an area C enclosed by a dotted and dashed line illustrated in FIG. 2.

In the support mechanism 80, a ball seat 81, a seat retainer 82, and a retainer gland 83 are disposed from the ball 4 side. The retainer gland 83 is biased toward the ball 4 by the spring 84. The seat retainer 82 has a step portion 82a provided on an outer diameter side thereof. An outer diameter side-portion of the retainer gland 83 protrudes toward the ball 4 at a position corresponding to the step portion 82a of the seat retainer 82, and pushes an end face of the step portion 82a of the seat retainer 82 via the seat packing 85. That is, a force of the spring 84 is transmitted in the order of the retainer gland 83, the seat packing 85, and the seat retainer 82, and acts so as to press the ball seat 81 against the ball 4. This structure provides close contact between the ball 4 and the ball seat 81 and close contact between the ball seat 81 and the seat retainer 82, and these close contact parts function as seals and prevent leakage of the fluid from the flow path to the outside. The ball seat 81 is made of a resin material or the like material that is softer than metal. Thus, an outer diameter side-portion of the ball seat 81 is supported by the outer ring 67 so that the ball seat 81 maintains its shape without being deformed, for example, when the fluid pressure is applied. The ball seat 81 and the outer ring 67 are fixed to each other with a C-ring 90 fitted into grooves which are provided on the counter surfaces of the ball seat 81 and the outer ring 67.

<Bonnet 2>

As illustrated in FIGS. 1 and 2, the bonnet 2 is fastened to the upper end part of the body 1 (stem housing section 6) with screws at a plurality of locations. By being fastened with the screws, the bonnet 2 can seal the upper end opening 6b of the stem housing section 6. By removing the screws, the bonnet 2 can be removed from the body 1 (stem housing section 6). In short, the bonnet 2 is detachably fixed to the upper end part of the body 1 (stem housing section 6).

The bonnet 2 has provided therein a through-opening portion 2a through which the upper end part of the stem 3 passes and in which the upper end part of the stem 3 is fixed. Further, the bonnet 2 has, at an upper end thereof, a gland plate 22 connected to the upper end of the stem 3. The gland plate 22 is connected to the operation section 9.

The bonnet 2 has a purge valve 21 that purges a fluid in the space (hollow part of the stem housing section 6) separated by the inner lid body 60 and the bonnet 2 in the body 1. In a case where the valve 10 is used for liquid hydrogen as in the present embodiment, it is not preferable that an air remains in the hollow part of the stem housing section 6. Thus, with use of the purge valve 21, it is possible to purge the air in the hollow part during the valve assembly. In addition, it is also possible to vacuum the hollow part or inject hydrogen gas. Further, even if liquid hydrogen from the flow path P leaks into the hollow part and causes expansion, safety can be ensured by purging with use of the purge valve 21. In short, the fluid purged by the purge valve 21 can include at least one of a liquid and a gas.

<Operation Section 9>

The operation section 9 has a handle 99 (FIG. 1) and allows a rotational operation of the handle 99 to be transmitted to the stem 3. As such a transmission mechanism, a mechanism of a well-known operation section can be employed.

As described above, the valve 10 of the present embodiment is used as a top entry type valve for liquid hydrogen. Thus, the body 1 is preferably an integral body that does not have joined portions provided by a method other than welding in an area where the valve housing section 5 (except for the ball 4 and the support mechanism 80), the stem housing section 6 (except for the stems 3 and the inner lid body 60), and the piping structure section 7, which constituent an outline element of the body 1, are disposed in the vacuum jacket. An integrated structure refers to a completely integrated structure that does not have connections with use of a bolt, a screw, or other jigs and does not have such connecting portions, or refers to a structure that have connecting portions which are provided by joining a plurality of parts (components) at only welded portions. Here, in a case where the joining is carried out by welding, the valve element housing section 5 and the stem housing section 6 may be welded, and the valve element housing section 5 and the piping structure section 7 may be welded. However, this is not the only manner of welding. For example, in the present embodiment, as illustrated in FIG. 2, welding is carried out between the valve element housing section 5 and the piping structure section 7, and the stem housing section 6 is constituted by welding three parts, and a lower part out of the three parts is realized by one member without having a welded seam with the valve element housing section 5. In short, the portions constituting the outline element of the body 1 are integrally structured by welding a plurality of parts.

By providing the integrated structure in this manner, it is possible to provide a reliable body 1 that does not cause liquid leakage and even leakage of liquid hydrogen. Further, as compared to the manner in which the connection is provided with use of a jig, the above manner eliminates the need to arrange a jig on the outer surface of the body 1 and allows the outer surface to be a surface having small asperities. This contributes to simplification of the inner surface structure of the vacuum jacket 100 described earlier and allows for smooth attachment of the vacuum jacket.

Further, since a plurality of parts are connected only by welding in this manner, the body 1 has high structural strength. Thus, it is possible to form a large flow path to allow a large amount of liquid hydrogen to flow therethrough. The flow rate can be set as appropriate on the basis of the pipe diameter of the pipe structure section 7, the size of the ball 4, and the diameter of the flow path 4*a*. For example, the valve 10 of the present embodiment can realize a configuration such that the pipe diameter of the piping structure section 7 and the diameter of the flow path 4*a* (diameter of the first opening) are relatively large diameters of not less than 25 centimeters. For example, the valve 10 of the present embodiment can be configured such that the pipe diameter of the piping structure section 7 and the diameter of the flow path 4*a* are approximately 10 inches to 24 inches (approximately 25 to 65 centimeters). A ball valve as used in the present embodiment can reduce a pressure loss. Thus, the ball valve having a smaller diameter can realize a comparable Cv value, as compared to other types of valves (glove valve and butterfly valve) used as a low temperature valve. For example, if the ball valve of the present embodiment is 24 inches, it is possible to achieve a Cv value comparable to that of a 36-inch butterfly valve.

Finally, materials of the individual constituent elements will be described. The body 1, which is realized by the above-described integrated structure, the ball 4, the trunnion plate 61, the yoke plate 62, the outer ring 67, the seat retainer 82, the spring 84, and the retainer gland 83 can be made of, for example, stainless steel. Further, the stem 3 can be made of heat-resistant steel. Further, the seal members 69*a* and 69*c* can be made of graphite. Further, the ball seat 81 can be made of a resin having heat resistance and wear resistance. Further, the bonnet 2 can be made of stainless steel. In the assembly of the valve 10 of the present embodiment, the upper part of the stem 3 is held while the stem 3 is connected to the ball 4, and the ball 4 is introduced from the upper end opening 6*b* to the valve element housing section 5 in the body 1. At this time, the support mechanism 80 may be installed in the valve element housing section 5 in the body 1 in advance, and may be introduced into the valve element housing section 5 at the same time so as to be located along the ball 4. In this way, the ball 4 and the support mechanism

80 are housed in the valve element housing section 5. Next, the trunnion plate 61 is introduced into the body 1 from the upper end opening 6*b* by, for example, pulling up with a predetermined fixture, and is then pulled down to the communication port 6*a*. Next, after the fixture of the trunnion plate 61 has been removed, the yoke plate 62 is introduced into the body 1 from the upper end opening 6*b* in a similar manner. Then, the yoke plate 62 is rotated in the body 1 with use of, for example, a fixture or other jig for rotation, and the screw structure provided on the outer circumference of the yoke plate 62 and the screw structure provided on the inner surface of the stem housing section 6 in the body 1 are screwed together. This allows the yoke plate 62 to be fixed to the body 1 and allows the trunnion plate 61 to be pressed toward the ball 4. After the ball 4, the support mechanism 80, and the inner lid body 60 are placed in the body 1 in this way, the bonnet 2 is attached to the upper end part of the body 1, and the operation section 9 and other member(s) are installed to complete the assembly of the valve 10. Such an assembly method allows the valve 10 of the present embodiment to be easily assembled even though the body 1 is shaped in a cylinder and is long in the longitudinal direction, and facilitates, for example, removal of the members in the body during, for example, maintenance.

[Variations]

(Variation 1)

In the above-described embodiment, the ball valve is configured. However, an aspect of the present invention is not limited to such a configuration. For example, a top entry type valve constituting a globe valve and a butterfly valve is also included in an aspect of the present invention. As the valve of the present invention, a valve having a valve element shaped such that a diameter in at least one direction is larger than the diameter of the stem which supports the valve element (i.e., exceeds the diameter of the stem) can exhibit an effect effectively in the structure of the present invention. Further, the valve of the present invention is particularly suitably applied to ball valves and butterfly valves that can switch between opening and closing by rotating the valve element 90 degrees with the rotation of the stem.

Note that, in the above embodiment, the flow path extends along one direction, and the piping structure section 7 on the upstream side and the piping structure section 7 on the downstream side between which the ball 4 is interposed are present as openings of the flow path. However, not only this mode in which the flow path has openings in two directions, but also a mode in which the flow path has openings in three or more directions may be employed.

(Variation 2)

Instead of the above-described embodiment, the bonnet 2 may be made of a heat insulating material, or a heat insulating body may be added to the bonnet 2. These modes are also included in an aspect of the present invention.

(Variation 3)

In the above-described embodiment, the stem housing section 6 has the hollow part. In this hollow part, a heat insulating body may be disposed. These modes are also included in an aspect of the present invention.

(Variation 4)

In the above-described embodiment, the inner lid body 60 is provided with the trunnion plate 61, the yoke plate 62, the seal members 69*a* and 69*c*, and the gland member 68. However, the inner lid body 60 may additionally include other constituents. For example, a sheet-shaped thrust washer may be provided between the trunnion plate 61 and the yoke plate 62 and/or between the trunnion plate 61 and the ball 4. Further, a curly hair ring may be provided between the inner circumferential surface of the through hole 62*a* of the yoke plate 62 and the outer circumferential surface of the stem 3. Further, a sheet-shaped trust washer may be provided between the gland member 68 and the yoke plate 62.

(Variation 5)

In the above-described embodiment, the valve configured as a top entry type valve in which the extension direction of the stem 3 is parallel to the vertical direction has been described. However, an aspect of the present invention is not limited to such a valve. Alternatively, a valve configured such that the extension direction (axial direction) of the stem 3 is inclined with respect to the vertical direction may be employed.

(Variation 6)

In the above-described embodiment, the body 1 is of a welded structure. However, a plurality of parts may be connected by a method other than welding. Note that, in the present variation, for example, in a case where a plurality of tubular parts 6 are connected using a jig such as a bolt, the length of the stem housing section 6 (also referred to as the length of the body 1) can be adjusted by changing the number of parts to be connected.

Embodiment 2

The following will describe another embodiment of the present invention. Note that, for convenience, members having functions identical to those of the respective members of the foregoing embodiment are given respective identical reference numerals, and a description of those members is not repeated.

In Embodiment 1 described above, the inner lid body 60 is fixed to the stem housing section 6 by screwing the screw structure provided on the outer circumferential surface 62*b* of the yoke plate 62 with the screw structure 6*e* of the stem housing section 6 of the body 1 (FIG. 4). However, the method of fixing the inner lid body 60 is not limited to this method. Alternatively, for example, the fixing method using a bolt as described above may be employed. Thus, the following will describe a mode in which the fixing method using a bolt is employed. Note that, in the following description, only differences from Embodiment 1 described above will be described. The contents which will not be described below are the same as those described in Embodiment 1 described above.

Figure 6:
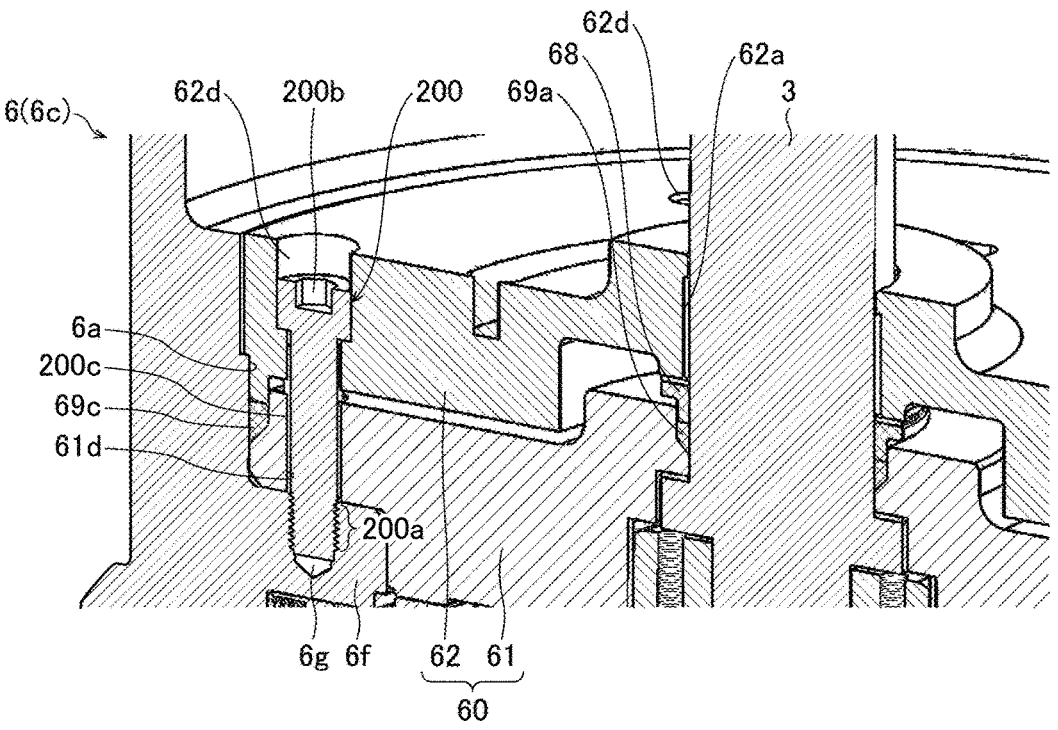
FIG. 6 is a cross-sectional perspective view illustrating the configuration of a portion of a top entry type valve in accordance with another embodiment of the present invention.

FIG. 6 is an enlarged cross-sectional view focusing on a portion at which the inner lid body 60 and the stem housing section 6 are fixed. In the present embodiment, there are no screw structures on the outer circumferential surface of the yoke plate 62 and on the inner circumferential surface of the stem housing section 6 that faces the outer circumferential surface of the yoke plate 62, and the inner lid body 60 is fixed to the stem housing section 6 using a bolt 200 (fixing means).

Specifically, as illustrated in FIG. 6, a bolt through hole 62*d* is provided in the yoke plate 62, a bolt through hole 61*d* is provided in the trunnion plate 61, and the bolt 200 is inserted into the through holes 61*d* and 62*d*. The bolt 200 is further inserted and fixed in a bolt recess 6*g* that is provided in an upper surface of a portion 6*f* at which the inner diameter of the communication port 6*a* provided at the lower end part of the intermediate part 6*c* of the stem housing section 6 decreases.

Here, a screw thread is provided on a tip portion 200*a* of the bolt 200. The tip portion 200*a* is screwed with a screw thread provided on the inner circumferential surface of the bolt recess 6*g*. Screwing in this way makes it possible to fix the yoke plate 62 in the stem housing section 6 of the body 1.

The bolt 200 further has a hole provided in a diameter-increased head 200*b* thereof. The bolt 200 has such a structure that a lower surface of the diameter-increased head 200*b* is locked in the bolt through hole 62*d* of the yoke plate 62. Thus, the bolt through hole 62*d* has a diameter-increased countersunk portion on the upper end opening 6*b* side of the stem housing section 6. In the example illustrated in FIG. 6, the diameter-increased head 200*b* of the bolt 200 is configured to be completely buried in the bolt through hole 62*d*.

As in Embodiment 1 described above, in the present embodiment, the trunnion plate 61 and the yoke plate 62 are not directly joined, and the seal members 69*a* and 69*b* are provided between the trunnion plate 61 and the yoke plate 62. Further, the inner circumferential surface of the bolt through hole 61*d* of the trunnion plate 61 has a portion corresponding to a screw thread-absent portion 200*c* of the bolt 200, and a small clearance is provided between the inner circumferential surface of the bolt through hole 61*d* and the screw thread-absent portion 200*c* of the bolt 200. Thus, in a state in which the bolt 200 is inserted in place, and the trunnion plate 61 seals the communication port 6*a* via the yoke plate 62, the trunnion plate 61 is slightly pushed upward in response to an increased fluid pressure, in the same manner as the trunnion plate 61 in Embodiment 1 described above. Thus, even in a case where the fixing with the bolt 200 is carried out as in the present embodiment, sealing by the pressure seal structure provided by the fluid pressure pushing up the trunnion plate 61 is easily exhibited.

A point at which fixing is carried out with such a bolt 200 is provided at a plurality of locations (two locations are illustrated in FIG. 6) in a circumferential direction centered around the stem 3.

The bolt 200 is fastened by inserting a hex wrench or the like from the upper end opening 6*b* side of the stem housing section 6 and inserting the hex wrench or the like into the hole of the diameter-increased head 200*b*.

In Embodiment 1 described above, the screwing of the screw structure provided on the outer circumferential surface 62*b* of the yoke plate 62 with the screw structure of the body 1, involves fine adjustments of the position of the yoke plate 62, such as a necessity to introduce the yoke plate 62 into the stem housing section 6 while keeping the yoke plate 62 level. This may require time. In contrast, according to the present embodiment, employing a fixing method carried out by bolting provides relatively easy alignment of the trunnion plate 61 and the yoke plate 62 in the stem housing section 6. This makes it possible to improve work efficiency. For the same reason, it is also possible to easily remove the yoke plate 61 and the trunnion plate 62. The structure according to the present embodiment is also advantageous in carrying out maintenance including, for example, replacement of the ball seat 81.

Embodiment 3

Another mode of fixing the inner lid body 60 will be described with reference to FIGS. 7 and 8.

Figure 7:
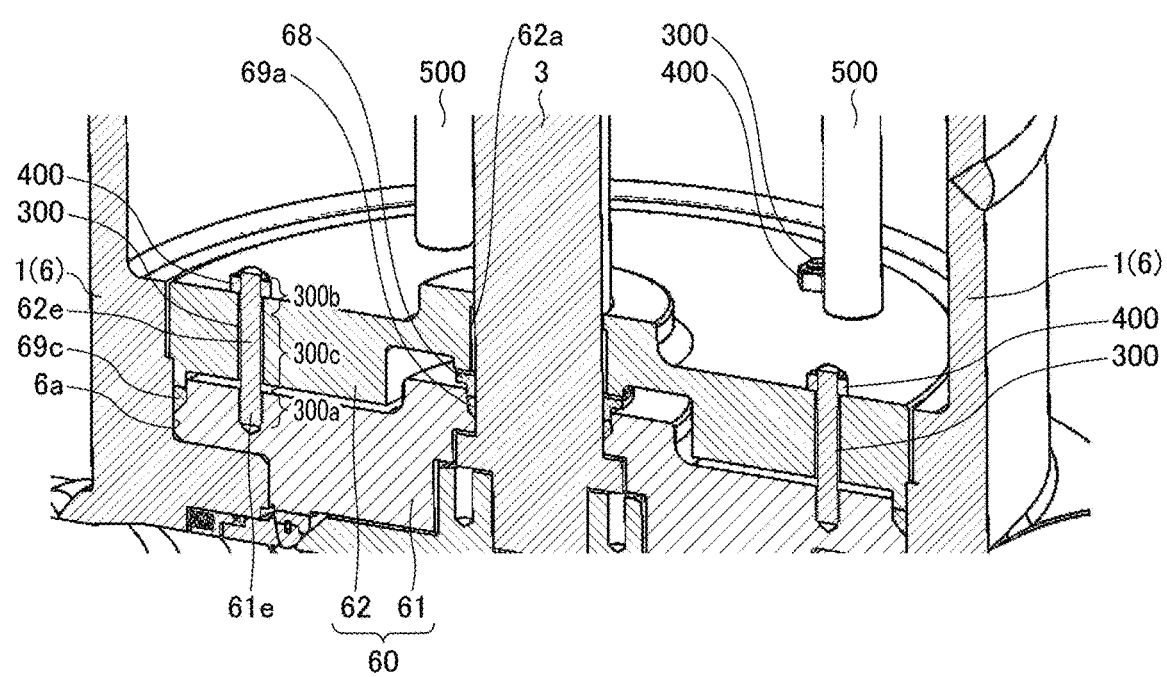
FIG. 7 is a cross-sectional perspective view illustrating the configuration of a portion of a top entry type valve in accordance with still another embodiment of the present invention.

FIG. 7 is an enlarged cross-sectional view focusing on a portion at which the inner lid body 60 and the stem housing section 6 of the body 1 are fixed. In the present embodiment, as in Embodiment 2 described above, there are no screw structures on the outer circumferential surface of the yoke plate 62 and on the inner circumferential surface of the stem housing section 6 that faces the outer circumferential surface of the yoke plate 62. The present embodiment differs from Embodiment 2 described above in that the yoke plate 62 and the trunnion plate 61 are integrated by a bolt 300 for plate connection. The present embodiment also differs from Embodiment 2 described above in that a stopper 500 (fixing means) for pressing and fixing the inner lid body 60 to the communication port 6a is provided on the yoke plate 62 side.

Specifically, as illustrated in FIG. 7, the bolt 300 for plate connection passes through a through hole 62e for connection provided in the yoke plate 62, and is further inserted into a recess 61e for connection provided in the upper surface of the trunnion plate 61.

As the bolt 300 for plate connection, a so-called double-screw bolt having screw threads at both ends 300a and 300b and having no screw thread in an intermediate part 300c can be used. The one end 300a at which a screw thread is provided is screwed with a screw thread provided on an inner circumferential surface of the recess 61e for connection. The other end 300b at which a screw thread is provided protrudes toward the upper surface of the yoke plate 62 and is screwed with a nut 400. Screwing the nut 400 with the bolt 300 for plate connection in this way allows the yoke plate 62 to be pressed toward the trunnion plate 61 and fixed to the trunnion plate 61. In the present embodiment, bolting with the bolt 300 for plate connection is provided at a plurality of locations (three locations are illustrated in FIG. 7) along a circumferential direction centered around the through hole 62a through which the stem 3 passes.

Here, as in the embodiments described above, in the present embodiment, the trunnion plate 61 and the yoke plate 62 are not directly joined, and the seal members 69a and 69b are provided between the trunnion plate 61 and the yoke plate 62. However, the integrated structure is provided by the bolt 300 for plate connection. Thus, in the present embodiment, the trunnion plate 61 and the yoke plate 62 can move up and down in the stem housing section 6 in a state in which the stopper 500 is not present. In other words, a mode is realized in which the stopper 500 suppresses this up-and-down movement, and the communication port 6a is sealed by the trunnion plate 61 and the yoke plate 62. Further, since the through hole 62e for connection in the yoke plate 62 is provided such that a small clearance is present between the yoke plate 62 and the bolt 300, the up-and-down movement of the yoke plate 62 is not restricted. This allows the trunnion plate 61 to move toward the yoke plate 62 upon application of the fluid pressure. With this configuration, even in a case where both the plate 61 and the plate 62 are integrated by the bolt 300 as in the present embodiment, the sealing provided by the pressure seal structure by the fluid pressure pushing up the trunnion plate 61 is easily exhibited.

Figure 8:
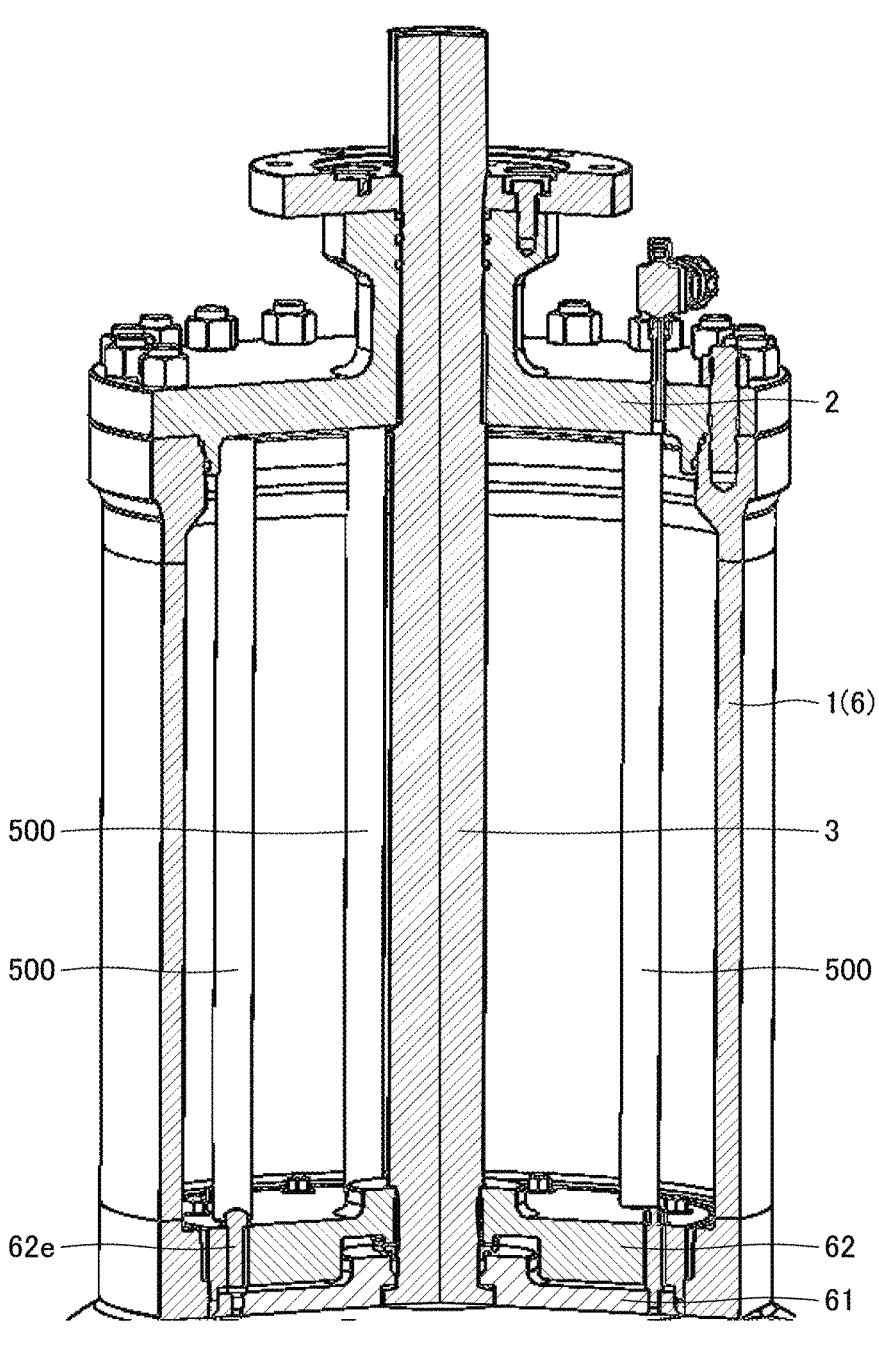
FIG. 8 is a cross-sectional perspective view illustrating the configuration of a portion of the valve illustrated in FIG. 7.

As illustrated in FIG. 8, the stopper 500 is a rod-shaped support that is connected, at one end thereof, to the upper surface of the yoke plate 62 and is connected, at the other end thereof, to the lower surface of the bonnet 2. The stopper 500 has a predetermined length and fixes the yoke plate 62 at a predetermined position of the stem housing section 6 in a state in which the bonnet 2 seals the upper end opening 6b of the stem housing section 6. The stopper 500, like the bolt 300 for plate connection, is provided at a plurality of locations (two locations are illustrated in FIG. 7, and three locations are illustrated in FIG. 8) in a circumferential direction centered around the through hole 62a through which the stem 3 passes. Note that the yoke plate 62 and the bonnet 2 may be provided with a structure, such as a recess, for receiving the stopper 500. The stopper 500 may be a single body or may be a structure fixed to the bonnet 2 or the yoke plate 62.

The present embodiment can improve work efficiency as in the above-described Embodiment 2 described above, as compared to Embodiment 1, since the present embodiment eliminates the need to screw the yoke plate 62 and the stem housing section 6. Furthermore, the present embodiment allows the trunnion plate 61 and the yoke plate 62 to be fixed in a unit manner in advance and then installed in the stem housing section 6. This, for example, facilitates providing the seal members 69a and 69b between the trunnion plates 61 and the yoke plates 62 and facilitates aligning the plates 61 and 62 with respect to the body since the yoke plate 62 is fixed by the stopper 500 after the yoke plate 62 has been disposed, without the need to fix the yoke plate 62 to the main body of the valve. The present embodiment thus allows for improvement in work efficiency in disposing the trunnion plate 61 and the yoke plate 62 in the stem housing section 6, as compared to Embodiment 2.

Embodiment 4

The following will describe other embodiment of the present invention. For example, in each of the embodiments described above, the yoke plate 62 has been fixed to the body by screwing the outer circumferential part or by fixing with use of a bolt. However, the fixing method is not limited to these methods. For example, the yoke plate 62 and the body 1 may be fixed with a bayonet structure. Further, as the trunnion plate 61, an integral plate has been used. Alternatively, a division structure such that a component around the stem 3 and another component on the side of the outer circumference of the component around the stem 3 are combined into one plate may be employed. In that case, the shaft seal provided by the seal member 69a of the trunnion plate 61 and the outer circumferential seal provided by the seal member 69c can be constructed with separate members. This may make it easy to obtain more excellent sealing properties of each of the seals.

Aspects of the present invention can also be expressed as follows:

The valve 10 in accordance with a first aspect of the present invention includes: a body 1 constituting a flow path of a fluid, the body 1 having a plurality of first openings (piping structure section 7) for distributing the fluid and a second opening (upper end opening 6b) that opens in a direction (Z-axis direction) intersecting with a direction (X-axis direction) in which the plurality of first openings face and that allows a valve element (ball 4) to pass therethrough; the valve element (ball 4) being placed in the body via the second opening and allowing the flow path P of the fluid to be opened and closed; a stem 3 being connected to the valve element and extending outside the second opening; a bonnet 2 sealing the second opening in such a manner that the stem 3 is operable; and an inner lid body partitioning a space in the body 1 into a space on a side of the bonnet and a space on a side of the valve element, in such a manner that the stem 3 is operable and in a liquid-tight or air-tight manner.

According to the configuration of the first aspect, the inner lid body 60 liquid-tightly or air-tightly partitions the space in the body into the space on the bonnet 2 side and the space on the valve element (ball 4) side, so that the valve element can be housed in a housing position in the body 1. This allows the stem 3 to be configured to be long and greatly separates the valve element and the bonnet 2. Thus, even in a case where a cryogenic fluid such as liquid hydrogen is employed as the fluid, the temperature of the cooled valve element is less likely to be transferred to the operation section 9 and other member(s). In short, with a simple configuration in which the stem 3 is lengthened, it is possible to provide the valve 10 in which heat of the fluid is less likely to be transferred to the bonnet 2 side. Therefore, it is possible to realize the valve 10 that allows for prevention of increases in manufacturing cost and maintenance cost and is applicable to cryogenic fluids.

Further, according to the configuration of the first aspect, it is possible to realize a top entry type such that the valve element is taken out through the second opening along the axial direction of the stem 3 which is connected to the valve element.

Further, in a second aspect of the present invention, the valve may be configured such that, in the first aspect of the present invention, the inner lid body 60 has a first plate (trunnion plate 61) and a second plate (yoke plate 62) in this order from a side closer to the valve element, the second plate is fixed to the body by a fixing means, and the first plate is not fixed to the body and is subjected to restriction in movement to the space on the side of the bonnet by the second plate being fixed to the body.

Further, in a third aspect of the present invention, the valve may be configured such that, in the second aspect of the present invention, provided on an outer circumferential surface of the second plate is a screw structure that is screwed with another screw structure 6e which is provided on an inner circumferential surface of the body 1, and the second plate is screwed into the body, thereby pressing the first plate toward the valve element.

According to the configuration of the third aspect, the second plate presses the first plate toward the valve element. That is, the first plate is not in a mode of being screwed toward the valve element with the screwing of the second plate. Thus, it is possible to prevent a screwing force from being transmitted to the valve element via the first plate.

Further, in a fourth aspect of the present invention, the valve may be configured such that, in the second aspect of the present invention, the second plate and the first plate have provided therein their respective bolt through holes, and movement of the second plate to the space on the side of the bonnet is restricted in such a manner that a bolt, which is the fixing means, passes through the bolt through hole of the second plate and the bolt through hole of the first plate and is fixed, at a tip end thereof, to the body and abuts, at another end thereof, on the second plate.

Further, in a fifth aspect of the present invention, the valve may be configured such that, in the second to fourth aspects of the present invention, the first plate and the second plate are in contact with each other via seal members 69a and 69c, the second plate presses the seal members 69a and 69c toward the first plate, and the seal member seals a gap between the first plate and an inner circumferential surface of the body in response to pressure from the second plate and presses the first plate toward the valve element.

According to the configuration of the fifth aspect, since the first plate and the second plate are not in direct contact, it is possible to prevent a screwing force of the second plate from being transmitted to the valve element via the first plate. Further, although the first plate is in a so-called floating state and is not in a mode of being directly connected to the body, it is possible to avoid the fluid from leaking from the flow path to the stem housing section since the seal members 69a and 69c are provided.

Further, in a sixth aspect of the present invention, the valve may be configured such that, in the first aspect of the present invention, the inner lid body has a first plate and a second plate in this order from a side closer to the valve element, the second plate is subjected to restriction in movement to the space on the side of the bonnet by a stopper 500 which is connected to a lower surface of the bonnet and to an upper surface of the second plate, and the first plate is not fixed to the body and is subjected to restriction in movement to the space on the side of the bonnet by the second plate.

Further, in a seventh aspect of the present invention, the valve may be configured such that, in the first to sixth aspects of the present invention, the valve element has a protrusion 4b provided at a position on an opposite side thereof from the stem, the body 1 has provided therein a recess 51a in which the protrusion 4b is fitted, and the protrusion 4b is such that a protruding end portion thereof is smaller in diameter than a base portion thereof.

According to the configuration of the seventh aspect, it is possible to fix the valve element to the body 1 by fitting the protrusion 4b of the valve element to the recess 51a of the body 1. Further, according to the above configuration, the protruding end of the protrusion 4b of the valve element is smaller in diameter than the base portion of the protrusion. This allows the protruding end of the protrusion 4b to function as a guide for fitting to the recess 51a. In the valve in accordance with an embodiment of the present invention, the body can be provided with a relatively long stem housing section in which a long stem is housed. Even in such a case, the protrusion 4b having the guide function facilitates the fixing of the valve element during valve assembly.

Further, in an eighth aspect of the present invention, the valve may be configured such that, in the first to seventh aspects of the present invention, the bonnet 2 has attached thereto a purge valve 21 that purges a gas in a hollow part of the body 1 in which the stem 3 is housed.

In the case of a valve for liquid hydrogen, it is not preferable that air remains in the hollow part of the stem housing section. However, according to the configuration of the eighth aspect, it is possible to purge the air in the hollow part during the valve assembly. In addition, it is also possible to vacuum the hollow part or inject hydrogen gas. Further, even if the fluid from the flow path leaks into the hollow part and causes expansion, safety can be ensured by purging with use of the purge valve 21.

Further, in a ninth aspect of the present invention, the valve may be configured such that, in the first to eighth aspects of the present invention, the valve element is a ball 4 of a ball valve.

According to the configuration of the ninth aspect, setting the diameter of the flow path of the ball valve and the pipe diameter of the piping structure section 7 to be equal to each other makes an obstacle caused by the valve element absent in the flow path of the piping structure section 7. This makes it possible to smoothly flow a large amount of fluid at a high pressure. Further, the ball 4 of such a ball valve is placed in the body 1 having a diameter slightly larger than that of the ball 4, and the space in the body 1 can be partitioned into the space on the valve element side and the space on the bonnet side only by the inner lid body 60 fixed to the inner circumferential surface of the body 1. This makes it possible to provide a compact outer shape as a whole.

Further, in a tenth aspect of the present invention, the valve may be configured such that, in the first to ninth aspects of the present invention, the body 1 is an integral body that does not have joined portions provided by a method other than welding.

According to the configuration of the tenth aspect, it is possible to employ the valve as a valve for liquid hydrogen.

Further, in an eleventh aspect of the present invention, the valve may be configured such that, in the first to tenth aspects of the present invention, the valve further includes a vacuum jacket, around an outside of the body, for providing airtight sealing.

According to the configuration of the eleventh aspect, it is possible to provide a highly reliable valve 10 capable of maintaining the fluid at a low temperature in a case where the fluid, like liquid hydrogen, has a low temperature.

Further, in a twelfth aspect of the present invention, the valve may be configured such that, in the first to eleventh aspects of the present invention, the first opening has a diameter of 25 centimeters to 65 centimeters.

According to the configuration of the twelfth aspect, it is possible to realize a valve that is applicable to a flow path having a relatively large diameter.

The present invention is not limited to the above-described embodiments and variations, but can be altered within the scope of the claims. The present invention also encompasses, in its technical scope, any embodiment derived by combining technical means disclosed in each of the embodiments and variations.

REFERENCE SIGNS LIST

1 body
2 bonnet
3 stem
4 ball (valve element) (ball of ball valve)
4*a* flow path
4*b* protrusion
5 valve element housing section
6 stem housing section
6*b* upper end opening
6*d* flange part
6*e* screw structure
7 piping structure section
9 operation section
10 valve
21 purge valve
51*a* recess
60 inner lid body
61 trunnion plate (first plate)
62 yoke plate (second plate)
62*b* outer circumferential surface
62*c* protruding portion
69*a*, 69*c* seal member
80 support mechanism
99 handle
100 vacuum jacket

The invention claimed is:

1. A valve comprising:
a body constituting a flow path of a fluid, the body having a plurality of first openings for distributing the fluid and a second opening that opens in a direction intersecting with a direction in which the plurality of first openings face and that allows a valve element to pass therethrough;
the valve element being placed in the body via the second opening and allowing the flow path of the fluid to be opened and closed;

a stem being connected to the valve element and extending outside the second opening;
a bonnet sealing the second opening in such a manner that the stem is operable; and
an inner lid body partitioning a space in the body into a space on a side of the bonnet and a space on a side of the valve element, in such a manner that the stem is operable and in a liquid-tight or air-tight manner, the inner lid body being provided in the body independently of the bonnet,
the inner lid body being provided with a through hole through which the stem passes,
the valve further comprising:
a shaft seal for sealing between an inner circumference of the through hole of the inner lid body and the stem; and
an outer circumferential seal for sealing between an outer circumferential surface of the inner lid body and an inner circumferential surface of the body,
the body further having a valve element housing section that houses the valve element, and a stem housing section that houses the stem,
the stem housing section having, at a lower end part thereof, a communication port that communicates with a part of the valve element housing section,
the stem housing section having the second opening at an upper end part of the stem housing section,
an inner diameter of the second opening and an inner diameter of an intermediate part that is sandwiched between the lower end part and the upper end part of the stem housing section being larger than an inner diameter of the communication port.

2. The valve according to claim 1, wherein the inner lid body has a first plate and a second plate in this order from a side closer to the valve element,
the second plate is fixed to the body by a fixing means, and
the first plate is not fixed to the body and is subjected to restriction in movement to the space on the side of the bonnet by the second plate being fixed to the body.

3. The valve according to claim 2, wherein provided on an outer circumferential surface of the second plate is a screw structure that is screwed with another screw structure which is provided on an inner circumferential surface of the body, and
the second plate is screwed into the body, thereby pressing the first plate toward the valve element.

4. The valve according to claim 2, wherein the second plate and the first plate have provided therein their respective bolt through holes, and movement of the second plate to the space on the side of the bonnet is restricted in such a manner that a bolt, which is the fixing means, passes through the bolt through hole of the second plate and the bolt through hole of the first plate and is fixed, at a tip end thereof, to the body and abuts, at another end thereof, on the second plate.

5. The valve according to claim 2, wherein the first plate and the second plate are in contact with each other via seal members,
the second plate presses the seal members toward the first plate, and
the seal member seals a gap between the first plate and an inner circumferential surface of the body in response to pressure from the second plate and presses the first plate toward the valve element.

6. The valve according to claim 1, wherein the inner lid body has a first plate and a second plate in this order from a side closer to the valve element, the second plate is subjected to restriction in movement to the space on the side of the bonnet by a stopper which is connected to a lower surface of the bonnet and to an upper surface of the second plate, and the first plate is not fixed to the body and is subjected to restriction in movement to the space on the side of the bonnet by the second plate.

7. The valve according to claim 1, wherein the valve element has a protrusion provided at a position on an opposite side thereof from the stem, the body has provided therein a recess in which the protrusion is fitted, and the protrusion is such that a protruding end portion thereof is smaller in diameter than a base portion thereof.

8. The valve according to claim 1, wherein the bonnet further has a purge valve that purges a fluid in a space separated by the inner lid body and the bonnet in the body.

9. The valve according to claim 1, wherein the valve element is a ball of a ball valve.

10. The valve according to claim 1, wherein the body is an integral body that does not have joined portions provided by a method other than welding.

11. The valve according to claim 1, further comprising a vacuum jacket, around an outside of the body, for providing airtight sealing.

12. The valve according to claim 1, wherein the first opening has a diameter of 25 centimeters to 65 centimeters.

* * * * *